(12) United States Patent
Uhlenbusch et al.

(10) Patent No.: US 10,682,899 B2
(45) Date of Patent: Jun. 16, 2020

(54) AIR VENT

(71) Applicant: DR. SCHNEIDER KUNSTSTOFFWERKE GMBH, Kronach (DE)

(72) Inventors: Olaf Uhlenbusch, Marktzeuln (DE); Thomas Gruenbeck, Teuschnitz (DE); Markus Langbein, Beiersdorf bei Coburg (DE); Bernd Huettel, Naila (DE); Gerhard Endres, Mainleus (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 57 days.

(21) Appl. No.: 15/736,191

(22) PCT Filed: Mar. 20, 2017

(86) PCT No.: PCT/EP2017/056514
§ 371 (c)(1),
(2) Date: Dec. 13, 2017

(87) PCT Pub. No.: WO2017/162562
PCT Pub. Date: Sep. 28, 2017

(65) Prior Publication Data
US 2019/0001792 A1  Jan. 3, 2019

(30) Foreign Application Priority Data

Mar. 21, 2016 (DE) .................. 10 2016 105 158
Mar. 21, 2016 (DE) .................. 10 2016 105 160
Oct. 13, 2016 (DE) .................. 10 2016 119 547

(51) Int. Cl.
*B60H 1/34* (2006.01)
*B60H 3/00* (2006.01)

(52) U.S. Cl.
CPC ......... *B60H 1/3435* (2013.01); *B60H 3/0028* (2013.01); *B60H 2001/3464* (2013.01); *B60H 2001/3478* (2013.01)

(58) Field of Classification Search
CPC .................. B60H 1/3435; B60H 1/34; B60H 2001/3478; B60H 2001/3464; B60H 3/0028
See application file for complete search history.

(56) References Cited

U.S. PATENT DOCUMENTS

| | | | |
|---|---|---|---|
| 6,364,760 B1 * | 4/2002 | Rooney ................ | B60H 1/3442 454/154 |
| 10,113,765 B1 * | 10/2018 | May ........................ | F24F 11/74 |

(Continued)

FOREIGN PATENT DOCUMENTS

| | | | | |
|---|---|---|---|---|
| CN | 203995568 | | 12/2014 | ............... B60H 1/34 |
| DE | 20216677 | | 4/2003 | ............... B60N 3/10 |

(Continued)

OTHER PUBLICATIONS

International Search Report (w/translation) and Written Opinion (no translation) issued in application No. PCT/EP2017/056514, dated May 24, 2017 (13 pgs).

(Continued)

*Primary Examiner* — Steven S Anderson, II
(74) *Attorney, Agent, or Firm* — Hayes Soloway P.C.

(57) ABSTRACT

A air vent with a housing has at least one opening for supplying an airflow and an opening for discharging the supplied airflow. The airflow can be supplied to the air vent from an air supply shaft or from an air supply line in a heating, ventilating, or air-conditioning systems for a motor vehicle. The housing of the air vent is adapted to be inserted into a wall opening or can be assembled behind such a wall opening and secured there via one of the at least two parts (Continued)

of the housing. In the non-use state of the air vent, one part of the housing lies in or over the other part of the housing.

12 Claims, 8 Drawing Sheets

(56) References Cited

U.S. PATENT DOCUMENTS

| | | | | |
|---|---|---|---|---|
| 2002/0081965 | A1* | 6/2002 | Demerath | B60H 1/3421 454/254 |
| 2010/0093267 | A1* | 4/2010 | Hogh | B60H 1/34 454/76 |
| 2014/0342651 | A1* | 11/2014 | Humburg | B60H 1/3407 454/143 |
| 2015/0151607 | A1* | 6/2015 | Weber | B60H 1/3414 454/152 |

FOREIGN PATENT DOCUMENTS

| | | | |
|---|---|---|---|
| DE | 102009058111 | 7/2010 | ............... B60H 1/34 |
| DE | 102010000802 | 7/2011 | ............... B60H 1/34 |
| DE | 102011100059 | 10/2012 | ............... B60H 1/34 |
| GB | 2463698 | 3/2010 | ............. F04D 29/44 |
| JP | H0535414 | 5/1993 | ............... B60H 1/34 |
| JP | 2004-522271 | * 7/2004 | |
| JP | 2004203090 | 7/2004 | ............... B60H 1/34 |
| JP | 2005280433 | 10/2005 | ............... B60H 1/34 |
| JP | 2008056006 | 3/2008 | ............... B60H 1/34 |

OTHER PUBLICATIONS

International Preliminary Report on Patentability (w/translation) issued in application No. PCT/EP2017/056514, dated Sep. 25, 2018 (18 pgs).

* cited by examiner

US 10,682,899 B2

AIR VENT

BACKGROUND OF THE INVENTION

The present invention relates to air vents.

Air vents, particularly for motor vehicles, are well known.

A ventilating arrangement for a motor vehicle is known from DE 10 2011 100 059 A1. The ventilating arrangement comprises a console with a console surface, in which is formed a mount, and includes an air vent movably mounted on the console. The air vent can be moved into an open setting, in which the air outflow opening projects from the mount, and a closed setting, in which the air vent is recessed at least partly in the mount. Also provided is a plurality of air guide elements which are mounted to be displaceable at least in part, wherein the displaceable air guide elements are displaceable into the open setting and, in the closed setting, are displaceable into a rest setting by co-operation with at least one abutment fixed relative to the console.

An air vent of a heating and ventilating or air-conditioning system in a motor vehicle is known from DE 10 2010 000 802 A1. The air vent comprises at least one air outlet nozzle with a nozzle housing connected with an air duct, and a nozzle insert mounted in the nozzle housing and provided with air slots, wherein the nozzle housing has a pivot axis for the nozzle insert so that this is rotatable in itself between an air outflow setting and a drink holding setting.

It is disadvantageous in the aforesaid prior art that the known air vents cannot be completely recessed into the dashboard or in the installed setting thereof, so that when not in use an almost smooth and planar surface arises and that depending on the desired air quantity to be delivered by the air vent it can be moved out of the surface in which the air vent is installed into appropriate different settings relative to the non-use and can produce a diffuse as well as directed air flow.

SUMMARY OF THE INVENTION

It is therefore an object of the present invention to overcome the disadvantages of the prior art and to demonstrate an air vent which circumvents and solves the aforesaid disadvantages.

The invention shows an air vent with a housing consisting of at least two parts. In addition, at least one opening for the supply of an air flow and opening for the discharge of the supplied air flow are present. The air flow can be supplied to the air vent from an air supply shaft or from an air supply duct in heating, ventilating or air-conditioning systems, particularly for passenger compartments in motor vehicles, and the air vent is insertable by the housing into a wall passage by way of one of the at least two parts of the housing or mountable behind such and fixable thereat. In the non-operational state of the air vent one of the at least two parts of the housing lies in or over the other part or parts of the housing. The air flow supplied by way of the opening is guided in the housing and flows out by way of the opening for the discharge of a flow of air. In operation of the air vent, the at least one part lying in or over the at least one other part of the housing can be moved, pushed or pulled out of this or shifted, moved or displaced away therefrom.

In an embodiment of the invention is provided that the at least one part lying in the at least one other part of the housing is the second part of the housing and the at least one part of the housing insertable into a wall passage or mountable behind such and fixable thereat is the first part of the housing.

In an embodiment of the invention is provided that arranged in the second part of the housing is a passage, which passes through the second part of the housing, with a wall which on one side of the passage forms the opening for discharge of the supplied air flow and on the opposite side forms at least one outlet region which conducts the air flow out of the second part of the housing and directs the air flow to the opening for discharge of a flow of air, wherein the opening for discharge of the supplied air flow and the opposite side of the passage in the outer wall of the second part of the housing have the shape of a circle or an oval or a stadium shape.

In an embodiment of the invention is provided that the at least one outlet region forms a gap which is defined by the wall of the second part of the housing and the wall of the passage, wherein the wall of the second part of the housing projects beyond the gap in the direction of the opening for the discharge of the supplied air flow, whereby the air flow is directed and accelerated after leaving the gap.

In an embodiment of the invention is provided that the wall of the passage has a concave form and extends from the opening, which is for discharge of the supplied air flow, to the opposite side.

In an embodiment of the invention is provided that the gap has a gap width of between one and four millimetres and the wall of the second part of the housing has in the region projecting beyond the gap a radius of between half a millimetre and up to three millimetres.

In an embodiment of the invention is provided that the at least one outlet region is arranged in the entire opening region.

In an embodiment of the invention is provided a threaded spindle is arranged in the housing, by means of which spindle the second part of the housing is movable out of the first part of the housing or movable into the first part of the housing, and wherein a continuous cavity into which a tube is insertable is present at the centre longitudinal axis of the threaded spindle.

In an embodiment of the invention is provided that the threaded spindle is mounted by way of a bearing within the first part of the housing and a gearwheel engaging in a gearwheel roller is arranged at the threaded spindle.

In an embodiment of the invention is provided that the tube consists of electrically conductive material and/or the tube consists of two electrically conductive regions which are electrically isolated from one another and run through the entire length of the tube, wherein a lighting unit arranged in the second part of the housing is electrically contactable by way of the tube and/or the tube has at the upper end in the region of the second part of the housing at least one opening which opens into the interior space of the second part of the housing so that aromatic substances can be delivered to the air flow by way of the tube and/or that a cable by means of which an electrical unit in or at the second part of the housing is electrically contactable can be arranged in the tube.

In an embodiment of the invention is provided that an electric motor is connectible with the gearwheel roller so that when the electric motor is in operation the second part of the housing is movable by means of the threaded spindle in dependence on the direction of running of the electric motor, wherein a coupling is arranged between the electric motor and the gearwheel roller.

An air vent is described in the following by way of actual embodiments. The following description based on actual embodiments does not represent limitation of the invention to any of these actual embodiments.

BRIEF DESCRIPTION OF THE DRAWINGS

In the figures.

In the figures the same parts and/or components are provided with the same reference numerals. These parts and/or components substantially correspond with one another insofar as nothing to the contrary is Indicated.

DETAILED DESCRIPTION OF THE INVENTION

Figure 1:
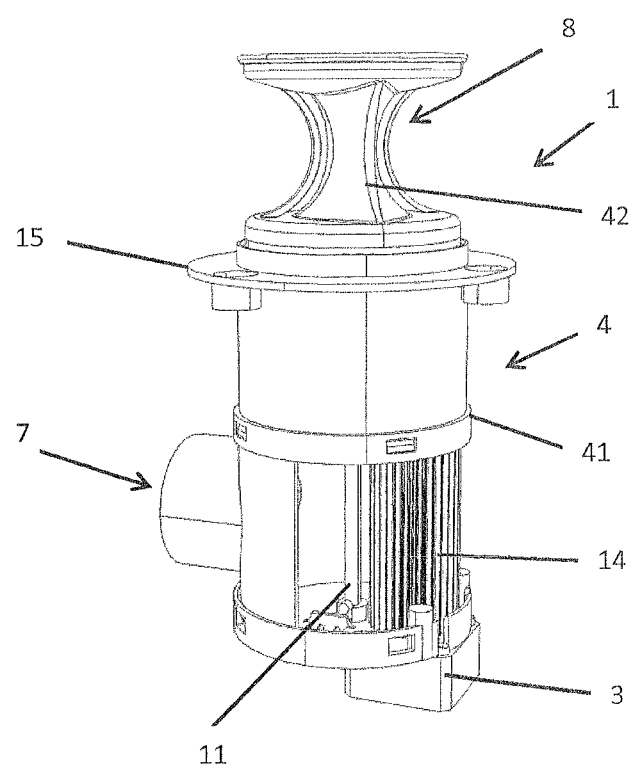
FIG. 1 shows a perspective schematic illustration of an air vent.

A schematic perspective illustration of an air vent 1 is illustrated in FIG. 1. The air vent 1 comprises a housing 4. The housing 4 consists of a first part 41 and a second part 42. The second part 42 of the housing 4 can be pushed into the first part 41 of the housing 4 and/or pushed out of this.

In FIG. 1 the second pert 42 of the housing 4 is moved out of the first part 41 of the housing 4 and represents an operational setting of the air vent 1.

The second part 42 of the housing 4 is formed to be somewhat smaller in its circumference or dimensions than the first part 41 of the housing 4 so that the second part 42 of the housing 4 can be almost completely pushed into the first part 41 of the housing 4.

In an alternative embodiment of the invention the second part 42 of the housing 4 is somewhat larger in its size or dimensioning than the first part 41 of the housing 4 so that the second part of the housing 4 can be pushed or displaced over the first pert 41 of the housing 4.

The housing 4 has an air supply opening 7. The air supply opening 7 is preferably arranged at the first part 41 of the housing 4. The arrangement is such that an air flow supplied by way of the air supply opening 7 does not pass directly into the housing 4, but is conducted in slightly laterally to slide along the inner wall of the housing 4.

According to the embodiment in FIG. 1 the air supply is realised in the form of a pipe or stub pipe flange-mounted laterally on the first part 41 of the housing 4.

The housing 4 in the embodiment according to FIG. 1 has a cylindrical plan with a base 2, so that by way of the opening 7 for the supply of an air flow there is generated, on inflow into the housing 4, an air vortex which runs through the housing 4 and extends, in helical form, to the opening 8 for discharge of a flow of air.

The opening 8 for discharge of a flow of air is arranged in the second part 42 of the housing 4.

The first pert 41 of the housing 4 has an edge web 15 which encircles at the upper end of the first part 41 of the housing 4. This serves for fixing the housing 4 in or to a dashboard of a motor vehicle.

At the lower side, i.e. at the base 2, an electric motor 3 can be arranged at the first part 41 of the housing 4. The electric motor 3 drives a gearwheel roller 14. This is disposed in operative connection by way of a gearwheel 13, which is not visible in FIG. 1, with the threaded spindle 10, which is similarly not illustrated in FIG. 1.

A straight, upright tube 11 is centrally arranged in the housing 4 at the middle. The threaded spindle 10 is movable up and down in the first part 41 of a housing 4 over this tube 11.

Figure 2:
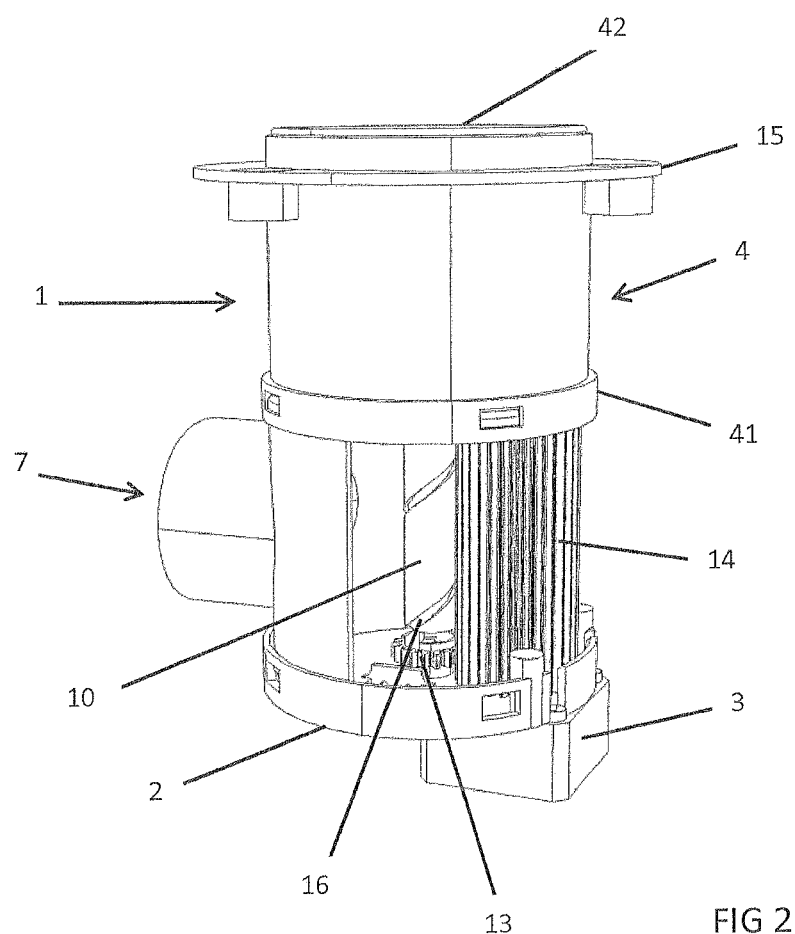
FIG. 2 shows a further perspective schematic illustration of an air vent according to the invention.

A further perspective schematic illustration of the air vent 1 is illustrated in FIG. 2. In FIG. 2, the second part 42 of the housing 4 is moved or pushed almost completely into the first part 41 of the housing 4. It can be seen that the upper side of the second part 42 of the housing 4 projects slightly above the edge web 15.

The threaded spindle 10, which is disposed in operative connection with the gearwheel 13, is illustrated. The gearwheel 13 is fixedly arranged at the bottom at the threaded spindle 10.

In an advantageous embodiment of the invention the threaded spindle 10 is produced from thermoplastics material and the gearwheel 13 is in that case injection-moulded on the threaded spindle 10.

A cavity in which in the setting according to FIG. 2 the tube 11 lies is present in the interior of the threaded spindle 10 and runs centrally therethrough at its longitudinal axis. The threaded spindle 10 is disposed in mechanical connection with the gearwheel roller 14 by way of the gearwheel 13. The threaded spindle 10 has on the outer side a groove 16 encircling the threaded spindle in the form of a helix. The threaded spindle 10 is supported in the housing 4 by way of webs 19, which are not illustrated in FIG. 2. The webs 19 form a bearing 12 in which the threaded spindle 10 is rotatably mounted.

In an advantageous embodiment of the invention the bearing 12 is constructed as a ball bearing.

The bearing 12 is in that case of such a configuration that on rotation of the threaded spindle 10 about the longitudinal axis thereof the threaded spindle 10 screws upwardly or downwardly in the bearing 12 by way of the groove 16 and thus displaces or moves the second part 42 of the housing 4 relative to the first part 41 of the housing 4.

Depending on the respective rotational direction of the electric motor 3, this drives the gearwheel roller 14. This transmits the rotational movement by way of the gearwheel 13 to the threaded spindle 10, which then moves upwardly or downwardly and displaces or moves the second part 42 of the housing 4 relative to the first part 41 of the housing 4.

Figure 3:
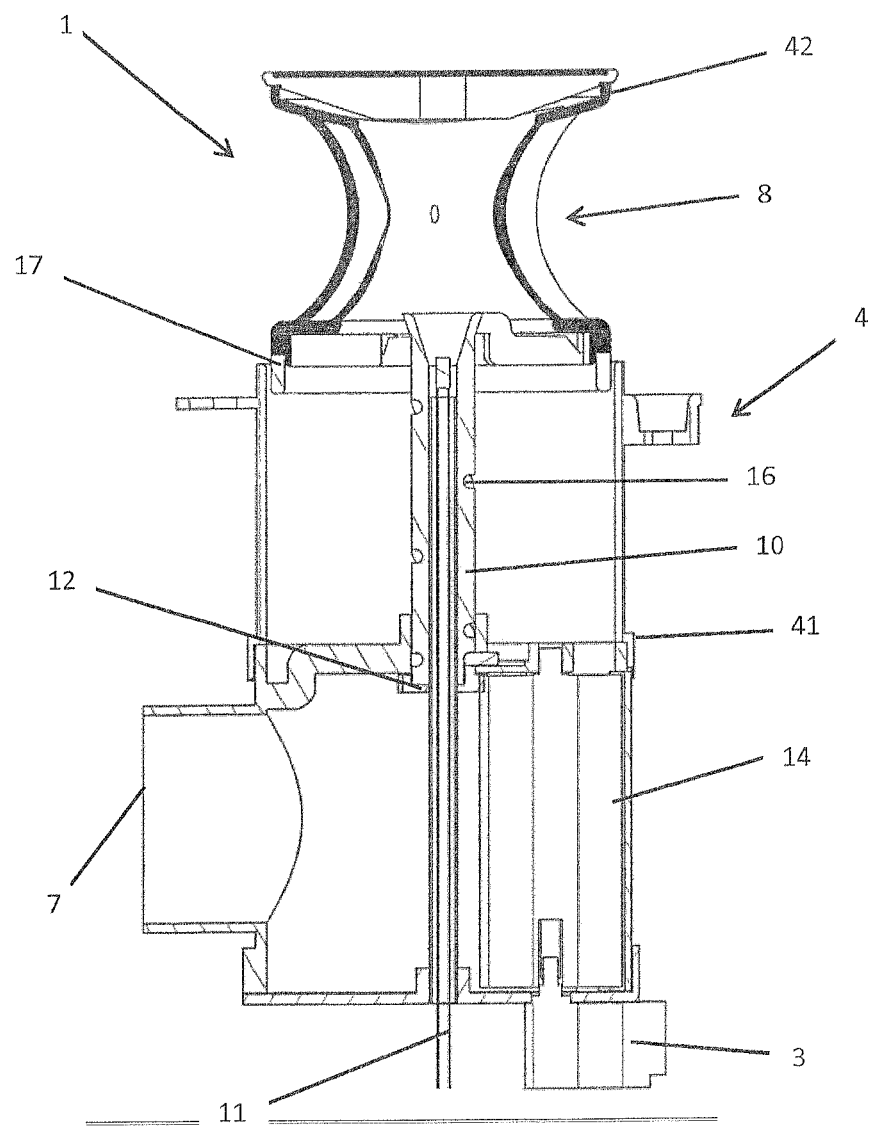
FIG. 3 shows a section through an air vent.

A section through an air vent 1 is illustrated in FIG. 3, wherein the second part 42 of the housing 4 is pushed out of the first part 41 of the housing 4. The threaded spindle 10, with the gearwheel 13, has in this position arrived at the upper end of the gearwheel roller 14. The maximum position of pushing of the second part 42 of the housing 4 out of the first part 41 of the housing 4 is thus achieved.

The tube 11 lies in the cavity in the threaded spindle 10. The tube 11 runs through the entire length of the first part 41 of the housing 4 and extends out beyond the lower side of the housing 4. The threaded spindle 10 is supported by way of the webs 19, which are not illustrated in FIG. 3, and the bearing 12. In the case of rotation of the threaded spindle 10 about the centre longitudinal axis the threaded spindle 10 is screwed or displaced by means of the groove 16, which is formed in the outer side of the threaded spindle 10 in the form of a helix extending from the bottom to the top, by way of the bearing 12 upwardly or downwardly in dependence on the direction of rotation and thus the second part 42 of the housing 4, which at the base end is coupled with the upper end of the threaded spindle 10, is pushed out of or drawn into the first part 41 of the housing 4.

The tube 11 has in the upper end an opening which opens into the interior space of the second part 42 of the housing 4. An aromatic substance or aromatic substances can be introduced and metered by way of this opening through the tube 11 into the interior space of the second part 42 of the housing 4. The air flow in the interior of the housing 4 generates, as already described, turbulence and thus the aromatic substances are entrained by the air flow and delivered to the environment when leaving the air vent 1.

A felt layer 17 is provided between the first part 41 of the housing 4 and the second part 42 of the housing 4. This serves the purpose of avoiding possibly occurring scraping noises when the second part 42 of the housing 4 is moved out of the first part 41 of the housing 4. In addition, scraping noises during rotation of the second part 42 of the housing 4 relative to the first part of the housing 4 are reduced, prevented or damped. At the same time, the felt layer 17 produces a seal between the first part 41 of the housing 4 and the second part 42 of the housing 4.

The second part 42 of the housing 4 is mounted and arranged to be rotatable relative to the first part 41 of the housing 4 about the centre longitudinal axis of the air vent 1 and in addition is movable out of or into the first part 41 of the housing 4 as already described.

The second part 42 of the housing 4 is rotatable relative to the first part 41 of the housing 4 so that the opening 8 for discharge of the flow of air is settable in a desired direction and thus the air flow exiting the opening 8 for discharge of the flow of air is settable in any desired direction.

Moreover, air guide elements (not illustrated in FIG. 3) which can additionally influence the orientation of the air flow are provided.

Optical conductors 18 are mounted in the second part 42 of the housing 4. These optical conductors 18 are connected with a lighting unit which delivers light, wherein the lighting unit is preferably a light-emitting diode or LED. The optical conductors 18 are provided so as to conduct and distribute the light, which is delivered by the lighting unit, along the air vent 1. The air vent 1 can thus be lit.

In a further advantageous embodiment of the invention provision is made to illuminate the air vent by way of the optical conductors 18 with blue light when the air issuing from the air vent 1 is cooler than the air in the interior space of the motor vehicle. Illumination is with red light when the air issuing from the air vent 1 is warmer than the air in the interior space of the motor vehicle, illumination is with white light when the air issuing from the air vent 1 has approximately the same temperature as the air in the interior space of the motor vehicle and illumination is with green light when the air issuing from the air vent 1 has run through a cleaning process by means of a filter or by means of the use of ozone prior to introduction into the interior space of the motor vehicle.

The power supply of the lighting unit with electrical energy advantageously takes place by way of a cable which is laid in the tube 11 or, however, directly by way of the tube 11 itself. In the latter case of power supply by way of the tube 11 itself, the tube 11 is preferably made of an electrically conductive material. Current can thus be conducted. In a further advantageous embodiment of the invention the tube 11 has two electrically conductive regions which are electrically isolated from one another and which run through the tube at the longitudinal axis so that the tube 11 can serve as a conductor for the feed and conducting away of electrical current. A cable or laying of a cable is thus eliminated.

The gearwheel 13 is fixedly arranged at the lower end of the threaded spindle 10. However, the gearwheel roller 14 is arranged to be offset relative to the axis of rotation of the threaded spindle 10 so that the gearwheel 13 is disposed in operative connection with the gearwheel roller 14. The gearwheel roller 14 is mounted at the top and bottom in the first part 41 of the housing 4 to be rotatable about the longitudinal axis and is in mechanically operative connection with the electric motor.

In an advantageous embodiment of the invention a slipping clutch is arranged between the electric motor 3 and the gearwheel roller 14.

Figure 4:
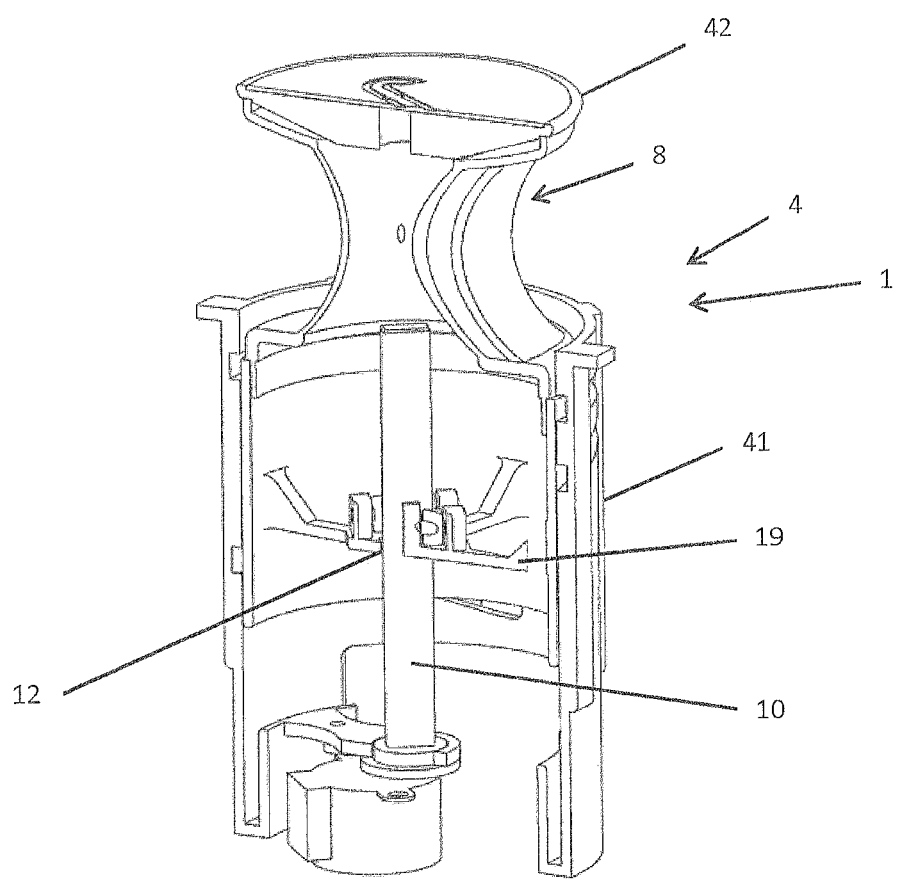
FIG. 4 shows a section through an air vent.

In FIG. 4 a further section through an air vent 1 is illustrated. The webs 19 which form the bearing 12 and support the threaded spindle 10 are connected with the inner side of the first part 41 of the housing 4. On rotation of the threaded spindle 10 about the longitudinal axis thereof the threaded spindle 10 moves upwardly or downwardly, depending on the respective direction of rotation, by means of the groove 16 which engages in an arrangement at a support 19. The threaded spindle 10 is connected by its upper end with the second part 42 of the housing 4, which is thus coupled with the threaded spindle 10 and the vertical movement thereof. However, the threaded spindle 10 is connected or coupled with the second part 42 of the housing 4 in such a way that the second part 42 of the housing 4 is rotatable about the spindle.

Figure 5:
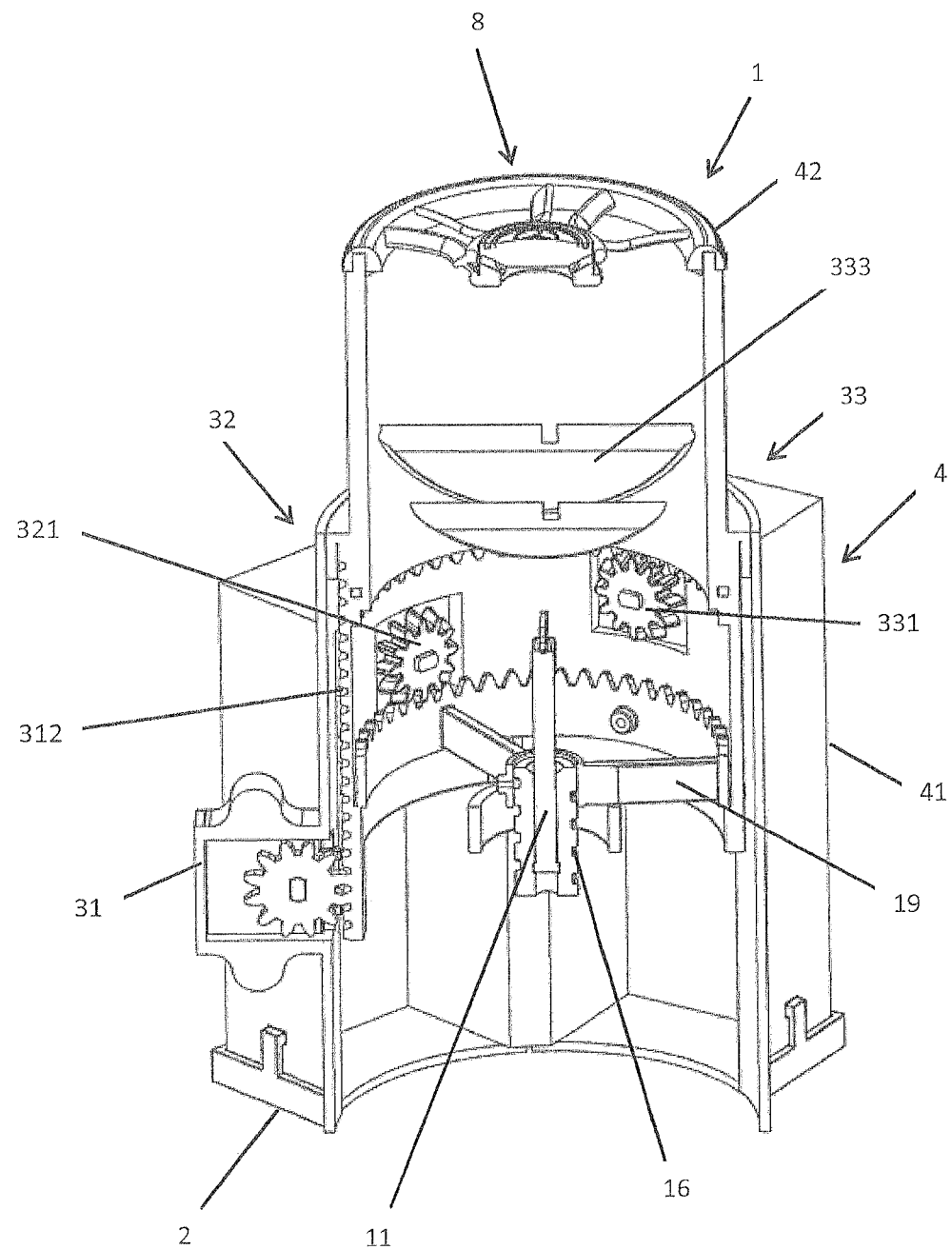
FIG. 5 shows a section through a further air vent.
Figure 6:
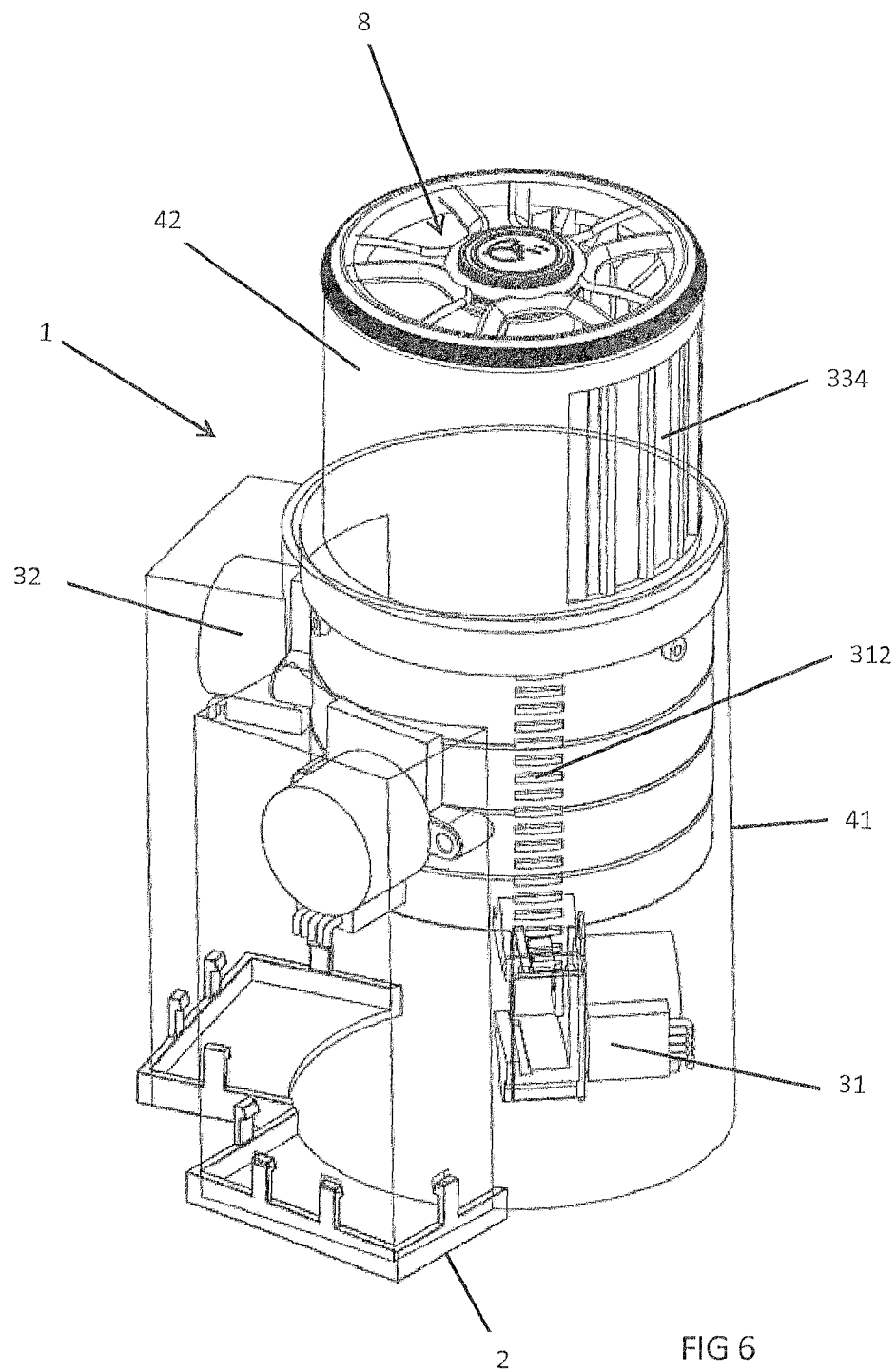
FIG. 6 shows a perspective view of a further air vent.

A section through a further embodiment of an air vent 1 according to the invention is illustrated in FIG. 5; a perspective view of such an air vent 1 is illustrated in FIG. 6.

However, according to the embodiment in accordance with FIG. 5 and FIG. 6 the housing shape of the first part 41 of the housing 4 and the second part 42 of the housing 4 is no longer geometrically identical, but different. Nevertheless, the second part 42 of the housing 4 can be pushed out of the first part 41 of the housing 4 or drawn into this.

The threaded spindle 10 can be eliminated, but the tube 11 is still present. The tube 11 is supported by webs 19.

A first electric motor 31 is present, which by way of a gearwheel 311 engages in recesses 312 arranged at the second part 42 of the housing 4 and pushes the second part 42 of the housing 4 out of the first part 41 of the housing 4 or pushes it into this depending on the respective rotational direction of the electric motor 31.

Moreover, a second electric motor 32 is present, which by way of a gearwheel 321 engages a rim gear 322—which is fixedly arranged at the inner side of the second part 42 of the housing 4—and rotates the second part 42 of the housing 4 relative to the first part 41 of the housing 4 about the centre axis. The electric motor 32 is connected with the second part 42 of the housing 4 and is moved together with this upwardly or downwardly by way of the first electric motor 31.

In addition, a third electric motor 33 in operative connection with a gearwheel 331 is present. This gearwheel 331 acts on slats 333, 334 which influence the orientation of the air flow. Horizontally arranged slats 333 are present, which lie in the second part 42 of the housing 4, and vertically arranged slats 334 are present, which are mounted in the wall of the second part 42 of the housing 4 and lie thereat.

According to the form of embodiment in accordance with FIGS. 5 and 6 the opening for discharge of the air flow 8 is provided at the top, but in addition the vertically arranged slats 334 are similarly adjustable by way of the electric motor 33 and open or close an opening in the wall of the second part 42 of the housing 4. Thus, air can also flow out laterally and can in addition can be influenced in its orientation by means of the slats 334.

Figure 7:
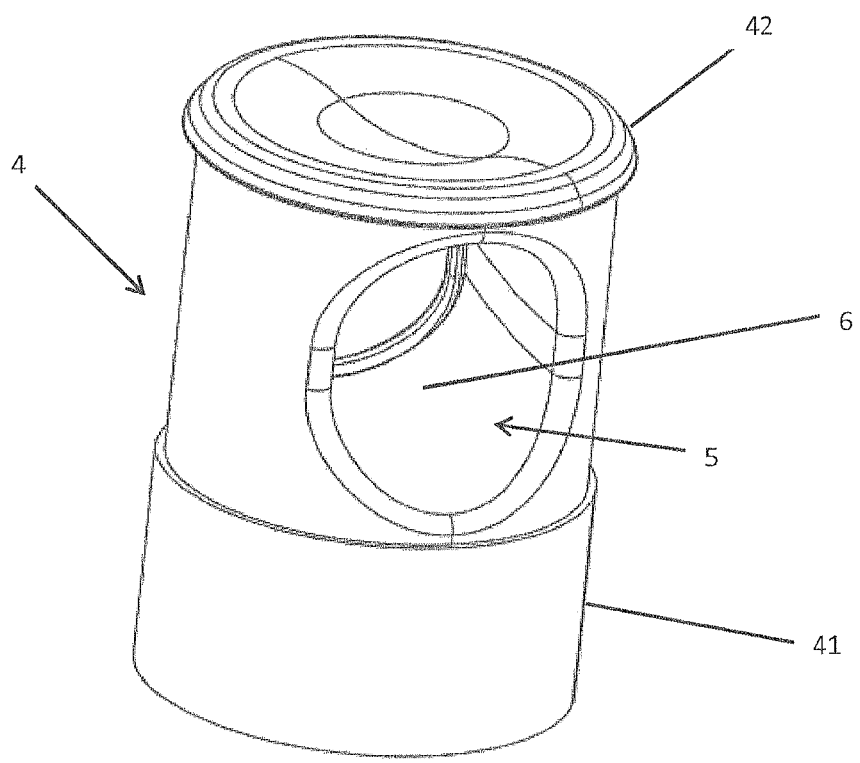
FIG. 7 shows a schematic illustration of a further air vent.

A housing 4 of an air vent 1 with the second part 42 pushed out of the first part 41 of the housing 4 is schematically illustrated in FIG. 7. The opening 8 for conducting out the flow of air is designed in the form of a continuous opening running completely through the second part 42 of the housing 4.

However, in order to direct the air flow the air vent 1 is constructed as a gap vent.

Figure 8:
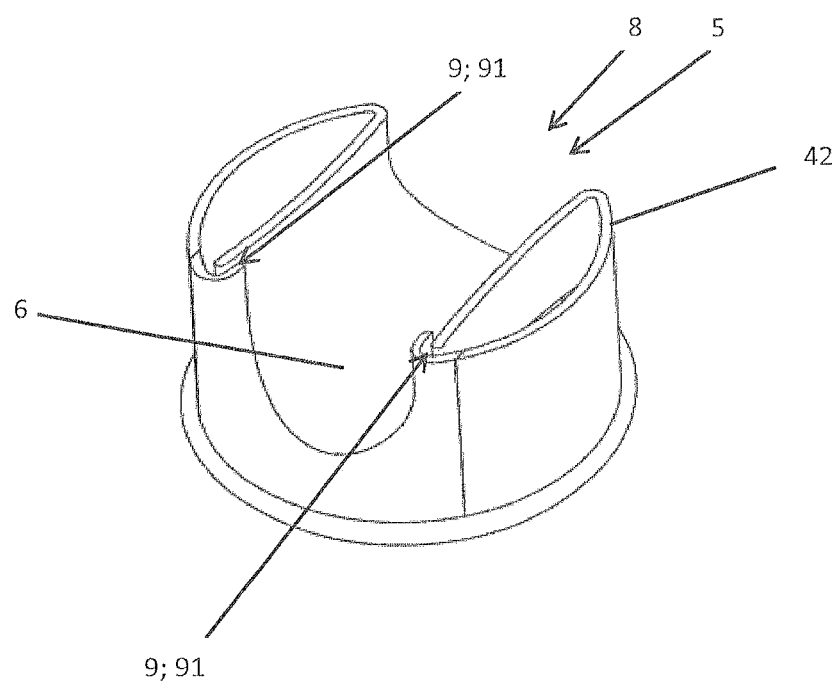
FIG. 8 shows a further schematic illustration of a further air vent.

A horizontal section through the second part 42 of the housing 4 is illustrated in FIG. 8. An opening 9, which forms the gap 91, is present on the side opposite the opening 8 for discharge of the flow of air. The opening 9 runs around almost the entire opening.

The gap 91 is formed by the wall 6 of the passage 5, which runs completely through the second part 42 of the housing 4. The outlet region 9 which defines the gap 91 is formed on the side of the passage 5 opposite the opening 8 for discharge of the supplied air flow. The air supplied to the air vent 1 is conducted out by way of this outlet region 9 and oriented in the direction of the opening 8 for discharge of the flow of air. Provided for this purpose is the gap 91, which is formed between the wall 6 of the passage 5 and the wall of the second part 42 of the housing 4, wherein in the region of the gap 91 the wall of the second part 42 of the housing 4 protrudes inwardly beyond the wall 6 of the passage 5.

The passage 5 has the form of a circle or an oval or a so-called stadium shape.

As already mentioned, the outlet region 9 defines the gap 91 which is formed by the wall of the second part 42 of the housing 4 and the wall 6 of the passage 5, wherein the wall of the second part 42 of the housing 4 protrudes beyond the gap 91 in the direction of the opening 8 for discharge of the supplied air flow, so that the air flow after leaving the gap 91 is oriented in the direction of the opening 8.

The air flow is accelerated by the gap 91 and the shaping thereof.

The wall 6 of the passage 5 has a concave shape and extends from the opening 8 for discharge of the supplied air flow to the opposite side.

In an advantageous embodiment this shape is also executed as a paraboloid.

The gap 91 has a gap width of between one and four millimetres. The wall of the second part 42 of the housing 4 advantageously has in the region projecting beyond the gap 91 a radius of between half a milimetre and up to three millimetres.

The second part 42 of the housing 4 has in the upper region an optical conductor 18 encircling the wall of the second part 42 of the housing 4. In a further embodiment of the invention the optical conductor surrounds the opening 8 for discharge of the flow of air.

In an advantageous embodiment of the invention a crank, which drives the threaded spindle, is provided instead of an electric motor.

In a further advantageous embodiment of the invention the electric motors 3, 31, 32, 33 are controllable by a control unit.

In a further advantageous embodiment of the invention the second part 42 of the housing 4 is rotatable about the centre axis by way of the spindle drive so that the opening 8 for discharge of the flow of air and thus the air flow are variable. Through rotation of the second part 42 of the housing 4 the air outflow direction can be set in different directions. It can, for example, be directed into the interior space or onto the windscreen or onto side panes.

In a further advantageous embodiment of the invention it is provided that the electric motors 3, 31, 32, 33 are controllable by way of the control unit in such a way that the second part 42 of the housing 4 and/or the slats 333, 334 adopts or adopt different presettable positions so that an optimal air distribution in the interior space of the motor vehicle can be undertaken.

A defrost setting can be set in which the air flow is directed almost completely onto the front pane, and a special air-conditioning function for the interior space can also be selected, in which case the second part 42 of the housing 4 then continuously changes in its orientation so that the entire vehicle interior space is the subject of air throughflow.

In an advantageous embodiment of the invention the electric motor 3 and the threaded spindle 10 are arranged externally at the housing 4. As a result, the air flow in the interior of the housing 4 is not influenced by the associated components.

If, for example, at least one respective air vent 1 according to the invention is arranged in the dashboard of a motor vehicle on the driver side and the passenger side alongside then in an advantageous embodiment of the invention it is provided that by means of the control unit the air vents 1 are controlled in their orientation of the second part 42 of the housing 4 in such a way that these rotate about the individual axes, but the direction of the air outlet openings are always oppositely oriented so that the individual air flows do not directly coincide and/or cancel one another and so that an air flow is always present in the motor vehicle.

REFERENCE NUMERAL LIST

1 air vent
2 base
3 electric motor
31 electric motor
33 electric motor
311 gearwheel
321 gearwheel
332 gearwheel
312 recesses
322 rim gear
333 slat
334 slats
4 housing
41 first part (of the housing)
42 second part (of the housing)
421 wall of the second part (of the housing)
5 passage
6 wall (of the passage)
7 opening for the supply of an air flow
8 opening for the discharge of a flow of air
9 outlet region
91 gap
10 threaded spindle
11 tube
12 bearing
13 gearwheel
14 gearwheel roller
15 edge web
16 groove
17 felt layer
18 optical conductor
19 webs

The invention claimed is:

1. An air vent comprising a housing comprised of at least two parts, with at least one opening for a supply of an air flow and an opening for discharge of the supplied air flow, wherein the air flow is supplied to the air vent from an air supply shaft or from an air supply line in a heating, ventilating or air-conditioning system in a motor vehicle, and the air vent is adapted to be inserted with the housing into a wall passage by way of one of the at least two parts of the housing or mountable behind the wall passage and fixable thereat, wherein in a non-operating state of the air vent one of the at least two parts of the housing lies in or over the other part or parts of the housing, wherein the air flow supplied by way of the at least one opening for a supply of an air flow is guided in the housing and flows out by way of the opening for discharge of a flow of air and in operation of the air vent the at least one part of the housing lying in or over the at least one other part of the housing can be moved, pushed or pulled out of the housing or shifted, moved or displaced away from the housing, wherein the at least one part lying in the at least one other part of the housing is a second part of the housing and the at least one part of the housing insertable into the wall passage or mountable behind the wall passage and fixable thereat is first part of the housing, wherein arranged in the second part of the housing is a passage, which passes through the second part of the housing, with a wall, which on one side of the passage forms the opening for discharge of the supplied air flow and on an opposite side forms at least one region which conducts the air flow out of the second part of the housing and directs the air flow towards the opening for the discharge of a flow of air, wherein the opening for discharge of the supplied air flow and the opposite side of the passage in the outer wall of the second part of the housing have the shape of a circle or an oval, wherein the at least one opening for the supply of the air flow is arranged at the first part of the housing such that the air flow supplied by way of the at least one opening for the supply of the air flow conducted laterally to slide along an inner wall of the housing, and wherein the housing has a cylindrical plan with base, so that by way of the at least one opening for the supply of the air flow there is generated, on inflow into the housing, an air vortex which runs through the housing and extends, in helical form, to the opening for discharge of the supplied air flow.

2. The air vent according to claim 1, wherein the at least one outlet region forms a gap running around almost the entire opening for discharge of a flow of air, which gap is defined by the wall of the second part of the housing and the wall of the passage, wherein the wall of the second part of the housing projects beyond the gap in the direction of the opening for discharge of the supplied air flow, and wherein in the region of the gap the wall of the second part of the housing protrudes inwardly beyond the wall of the passage, whereby the air flow is directed and accelerated after leaving the gap.

3. The air vent according to claim 1, wherein the wall of the passage has a concave form and extends from the opening for discharge of the supplied air flow, which is for discharge of the supplied air flow, to the opposite side.

4. The air vent according to claim 2, wherein the gap has a gap width of between one and four millimetres and the wall of the second part of the housing has in the region projecting beyond the gap a radius of between half a millimetre and up to three millimetres.

5. The air vent according to claim 2, wherein the at least one outlet region with the gap is arranged in an entire opening region.

6. The air vent according to claim 1, wherein arranged in the housing is a threaded spindle by which a second part of the housing is movable out of a first part of the housing or movable into the first part of the housing, wherein a continuous cavity into which a tube is insertable is present at a centre longitudinal axis of the threaded spindle.

7. The air vent according to claim 6, wherein the threaded spindle is mounted within the first part of the housing by way of a bearing and a gearwheel engaging in a gearwheel roller is arranged at the threaded spindle to drive the spindle.

8. The air vent according to claim 6,
wherein a tube which is inserted in the continuous cavity of the threaded spindle, is formed of an electrically conductive material and/or the tube comprises two electrically conductive regions running through an entire length of the tube which are electrically isolated from each other,
wherein a lighting unit arranged in the second part of the housing is electrically contactable by way of the tube and/or
that the tube has at the upper end in the region of the second part of the housing at least one tube opening which opens into the interior space of the second part of the housing so that aromatic substances can be delivered to the air flow by way of the tube and/or
that a cable electrically connected to an electrical unit in or at the second part of the housing is arranged in the tube.

9. The air vent according to claim 7, wherein an electric motor is connectable with the gearwheel roller so that when the electric motor is in operation the second part of the housing is movable by a threaded spindle in dependence on a direction of running of the electric motor and wherein a coupling is arranged between the electric motor and the gearwheel roller.

10. The air vent according to claim 9, wherein the second part of the housing is rotatable about the longitudinal axis thereof, wherein the rotational movement takes place by way of the electric motor and the second part of the housing has a felt layer in the contact region with respect to the first part of the housing or the felt layer is arranged at the second part of the housing.

11. The air vent according to claim 1, wherein the second part of the housing is surrounded in the upper region by an optical conductor encircling a wall of the second part of the housing and/or the optical conductor surrounds the opening discharge of e supplied air flow.

12. The air vent according to claim 1, wherein the opening for the supply of an air flow is formed by a pipe or stub pipe laterally flange-mounted on the first part of the housing.

* * * * *